United States Patent [19]

Teague et al.

[11] Patent Number: 5,431,715
[45] Date of Patent: Jul. 11, 1995

[54] PROCESS FOR REMOVING EMISSIONS BY CONDENSATION AND PRECIPITATION

[75] Inventors: Beth O. Teague; David F. Mitchell, both of Asheville; Joseph T. Flack, Candler; Dennis G. Shealy, Fletcher, all of N.C.

[73] Assignee: BASF Corporation, Mt. Olive, N.J.

[21] Appl. No.: 159,996

[22] Filed: Nov. 29, 1993

[51] Int. Cl.⁶ ............................................ B03C 3/014
[52] U.S. Cl. ................................. 95/67; 8/149.2; 95/69; 95/70; 95/288
[58] Field of Search ................. 95/67, 69, 70, 63, 288; 96/55, 57, 74, 52; 55/267; 8/149.1, 149.2, 149.3

[56] References Cited

U.S. PATENT DOCUMENTS

| | | | |
|---|---|---|---|
| 3,998,588 | 12/1976 | Coraor et al. | 8/149.2 X |
| 4,007,024 | 2/1977 | Sallee et al. | 96/65 |
| 4,255,406 | 3/1981 | Isalski et al. | 95/288 X |
| 4,287,138 | 9/1981 | Buckner | 8/149.1 X |
| 4,484,451 | 11/1984 | Darm | 95/288 X |
| 4,527,343 | 7/1985 | Danneberg | 8/149.3 X |
| 4,642,828 | 2/1987 | Lundberg | 8/149.3 |
| 4,652,988 | 3/1987 | McLain et al. | 96/81 |
| 4,676,807 | 6/1987 | Miller et al. | 55/527 X |
| 4,696,679 | 9/1987 | Albulescu et al. | 96/57 X |
| 4,759,782 | 7/1988 | Miller et al. | 55/527 X |
| 4,881,953 | 11/1989 | Prasad et al. | 55/267 X |
| 4,984,317 | 1/1991 | Christ | 8/149.1 |
| 5,282,876 | 2/1994 | Murphy et al. | 95/288 |

FOREIGN PATENT DOCUMENTS

| | | |
|---|---|---|
| 9015836 | 4/1991 | Germany . |
| 2126496 | 3/1984 | United Kingdom . |
| 8903499 | 4/1989 | WIPO . |

OTHER PUBLICATIONS

Trion Electronic Air Cleaners, Model Series 60, Trion, Inc., Sanford, N.C., Jan. 1991.
Trion Electronic Air Cleaners, Model 71 Series, Trion, Inc., Sanford, N.C., Jan. 1991.
EPS, Inc., Pollution Control System for Tenter Frame Emissions, Sep., 1991.
Trion, Inc., Application Study, Textile-Tenter Frame Exhaust, Nov., 1993.

Primary Examiner—Richard L. Chiesa
Attorney, Agent, or Firm—Nixon & Vanderhye

[57] ABSTRACT

Disclosed is a process for removing emissions, originated in the manufacturing industry, especially from polymerization operations and thermoplastic polymer processing operations by collecting the air, containing the emissions, cooling the air, directing the air to a liquid removal system and heating the air.

24 Claims, 5 Drawing Sheets

PROCESS FOR REMOVING EMISSIONS BY CONDENSATION AND PRECIPITATION

FIELD OF THE INVENTION

The present invention relates generally to a process for removing emissions which originate in various manufacturing industries, such as the chemical, pharmaceutical, coatings, recycling and oil industries. Especially, it relates to a process which is suitable for removing monomer, oligomer, additives and water emissions before, during and after the polymerization reaction for the manufacture of thermoplastic polymers and during thermoplastic polymer processing operations like extrusion, injection molding and fiber spinning operations.

BACKGROUND OF THE INVENTION

In the manufacturing industry, like the chemical, pharmaceutical, coating, recycling and oil industry, there exists a broad variety of sources for emissions which are released in the environment, which is not desirable. For example, in chemical reactions, emissions of reaction components, additives and solvents may be released. During coating of cars, vapors of coatings, additives and solvents may be released. During recycling of polymers, monomers or oligomers of the hydrolyzed polymer may be released. During cleaning of reactors, chemicals and solvents may be released.

Before, during and after the polymerization reaction for the manufacture of thermoplastic polymers like polyamides, polyester, polyolefins, polycarbonates, polystyrenes, polyacrylonitriles, polyurethanes, polysulfones, polyethersulfones, polyvinylchloride, copolymers and mixtures thereof, monomer vapors may be released in the environment from transportation tanks, storage tanks, pipelines, ducts, polymerization reactors, polymer melts, polymer strands, water bath, cutters, dryers and the like. During thermoplastic polymer processing like injection molding or extrusion, the thermoplastic polymers are for example extruded through an extruder into strands for chip production or into films, fibers, profiles, tubes and the like. During the extrusion at a temperature of from about 180° to about 350° C., monomer or oligomer vapors, compounds formed by thermal evaporation, thermal decomposition, or vapors of additives are released from the surface of the extruded polymers, which are leaving the nozzle of the extruder. These vapors evaporate immediately into an aerosol that would form deposits in the neighborhood of the extruder and therefore, must be removed, which is usually done by the quench air removal. The exhaust air is usually released in the environment, which is not desirable.

During the manufacture of synthetic yarns, a heat setting step is applied to the yarn for setting a twist in the yarn. In a heat setting unit, heat in form of hot air and/or steam is applied to the yarn. The air and/or steam contains emissions like monomers, oligomers and finish oils, when it exits the heat setting unit, which should be removed.

U.S. Pat. No. 4,676,807 discloses a process for removal of liquid aerosols from gaseous streams by passing the stream through a coalescing filter. In the examples of this patent, oil and water aerosols were tested.

U.S. Pat. No. 4,759,782 which is a C.I.P. of an application which issued as U.S. Pat. No. 4,676,807 described above, discloses the coalescing filter for removal of liquid aerosols from gaseous streams.

The technical bulletin Wringer ®, Des Champs Laboratories Inc., Va., describes a process for the dehumidification of air.

An object of the present invention was to provide a process for removing emissions from a broad variety of emission sources.

Another object of the present invention was to provide a process for removing of emissions from polymerization operations and thermoplastic polymer processing operations.

Another object was a process for removing emissions from fiber spinning operations.

Another object was a process for removing emissions from a heat setting operation for the manufacture of synthetic yarns.

Still another object was a process for removing emissions from a heat setting operation for the manufacture of polycaprolactam yarns.

SUMMARY OF THE INVENTION

The objects of the present invention could be achieved with a process for removing emissions, which comprises:

a) collecting air, containing the emissions;
b) directing at least a portion of the air, containing the emissions through a means for cooling the air;
c) directing the air, exiting the means for cooling the air to a means for removing liquid droplets from the air;
d) directing the air, exiting the means for removing liquid droplets from the air to a means for heating the air.

DESCRIPTION OF THE PREFERRED EMBODIMENTS

The apparatus for the process of the present invention is suitable for removing emissions from a broad variety of emission sources in the manufacturing industry like the chemical, pharmaceutical, coating, recycling and oil industry. The following example from the chemical industry show the applicability of the process for removing emissions which are released before, during and after the polymerization reaction for the manufacture of polymers and during the thermoplastic processing of polymers into polymer articles.

Articles, made from thermoplastic polymers, like polyamides, polyesters, polyolefins, polycarbonate, polyacrylonitrile, polyurethane, polysulfons, polyethersulfones, polyvinylchloride and the like are manufactured in several steps. One step is the polymerization of monomers to a thermoplastic polymer, followed by the thermoplastic processing into the final shape of the article.

Figure 1:
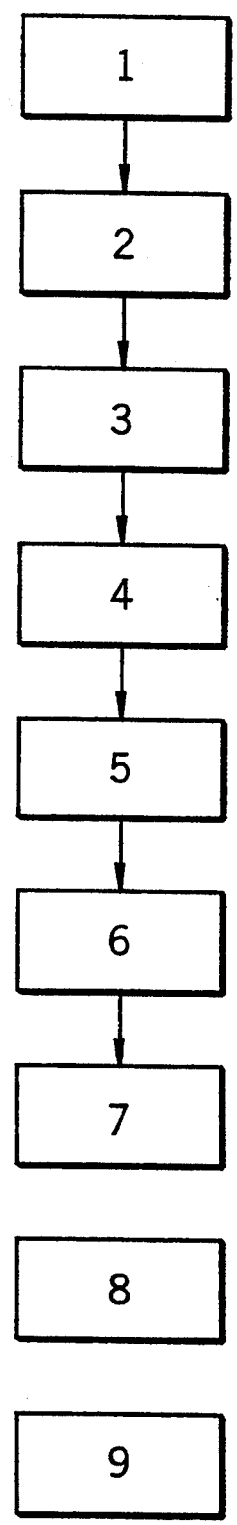
FIG. 1 is a flow chart of a polymerization operation and a thermoplastic processing operation.

FIG. 1 shows a general flow chart for the manufacture of such articles including a polymerization operation comprising the feedstock transfer (1), the feedstock processing (2), the reactor (3) and the polymer processing (4) as well as a thermoplastic processing operation comprising the thermoplastic processing (5), conditioning (6) and the final thermoplastic polymer product (7). Also included in the operation is a cleaning operation (8) and a recycling operation (9).

The feedstock transfer (1) includes the monomer transport via pipeline, truck, rail, drum, sack and the like. The feedstock processing (2) comprises storage tanks, mixing and conditioning of monomers. The reactor (3) comprises the reaction chamber where the polymerization reaction takes place and all the peripheral equipment like columns and pipes. After the polymerization is finished the polymer melt exits the reactor and is transformed into chips, flakes or granules in the polymer processing (4) which comprises pump blocks where the polymer melt is formed into polymer strands, a water bath for cooling the polymer strands, a cutter for cutting the polymer strands into chips and a dryer to dry the chips. In fluidized bed reactors for the manufacture of for example polyolefins, the polymer is formed into granules, which exit the reactor without further polymer processing (4).

In the thermoplastic processing operation, the thermoplastic polymer is melted, for example, in an extruder or injection molding machine which is shown as thermoplastic processing (5). The polymer exits the injection molding machine in form of a shaped article. The polymer melt exits the extruder in form of strands, films, fibers, profiles, tubes and the like, which are conditioned in the conditioning (6), which includes the treatment with quench air, finish application, drawing, texturizing, heat setting and the like to form the final thermoplastic article (7). In all seven stages, emissions may be released in the environment like monomers, oligomers, additives like finish oils, solvents, decomposition products and the like. For example emissions of monomers may be released during feedstock transfer from pipelines, trucks, rails or drums from vents of storage tanks or reactors, during polymer processing, during thermoplastic processing from the exit of the extruder or injection molding machine, during conditioning of for example fibers with regard to quenching, finish application or heat setting.

Emissions may be released also in cleaning operations (8) of the equipment used in (1) to (7) and (9) and in recycling operations (9), where thermoplastic polymer is depolymerized in monomers, the monomers are recovered and again polymerized. The process of the present invention is applicable to all emission sources, originated in polymerization operations, thermoplastic processing operations, cleaning operations or recycling operations, especially multicomponent air streams containing caprolactam emissions, finish oils and water.

The following is a description of the apparatus of the present invention applied to heat setting of synthetic yarns as one example of the above mentioned multiplicity of possibilities for emissions.

One apparatus for the process of the present invention for removal of emissions from heat setting of synthetic yarns is described with reference to FIG. 2.

Figure 2:
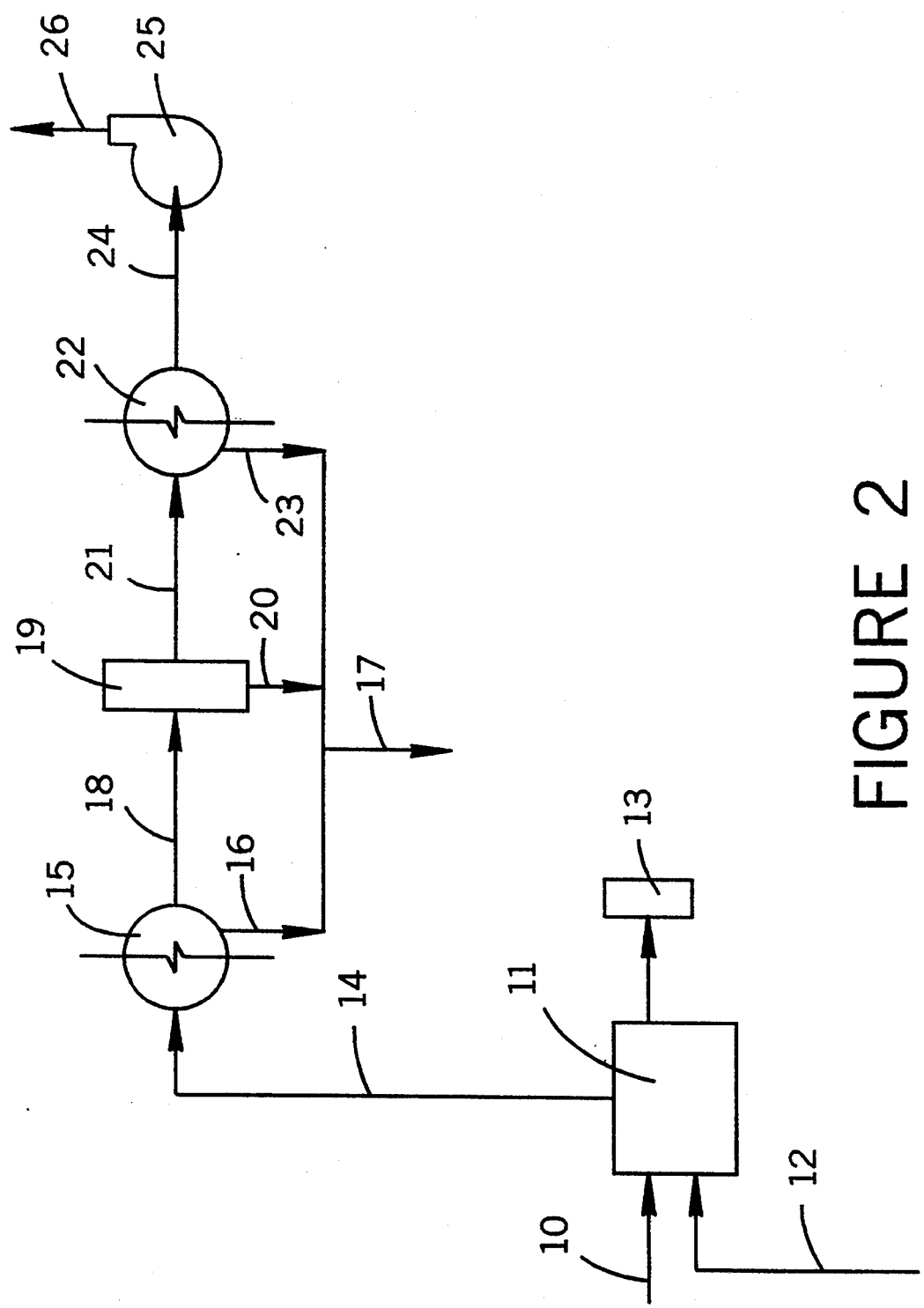
FIG. 2 is a schematic view of an apparatus for the process of the present invention for removing emissions from a heat setting unit for synthetic yarns with two heat exchangers and a liquid removal system located between the two heat exchangers.

FIG. 2 shows a heat setting operation for the heat setting of synthetic yarns and a process for removing emissions originated in the heat setting operation. Twisted yarn (10) is heat set in the heating chamber (11) with hot air and/or steam, from duct (12), followed by winding up on a package (13). The hot air and/or steam, containing the emissions from the yarn (10), exits the heating chamber (11) over duct (14) and is directed to the first heat exchanger (15), where it is cooled.

In the first heat exchanger (15) a part of the emissions condenses and is removed over pipes (16) and (17).

The first heat exchanger is cooled with a cooling medium like air, water, an aqueous solution, an organic solvent, an inorganic solvent, and the like. Optionally a cooling tower or another heat exchanger may be used to reject or transfer the heat from the cooling medium, which is not shown in FIG. 2.

The cooled air exits the first heat exchanger (15) and is directed via duct (18) to a liquid removal system (19) for removing liquid droplets from the air. Suitable liquid removal systems are an electrostatic precipitator, a mist eliminator such as a demister pad, mesh pad, and the like, a fiberbed filter and combinations thereof. Preferred is an electrostatic precipitator, a mist eliminator and a combination of a mist eliminator and an electrostatic precipitator, connected by a duct to each other. The term duct also includes connections of all kinds and/or shapes between two units for the transport of air and is not limited to tubes. Precipitates in the liquid removal system (19) are removed over pipes (20) and (17).

The air, exiting the liquid removal system (19), is directed over duct (21) to the second heat exchanger (22), wherein the air is heated. Condensibles are removed over pipes (23) and (17). The second heat exchanger is heated with a heating medium like air, water, an aqueous solution, an organic solvent, an inorganic solvent and the like. The heated air, exiting the second heat exchanger (22) is directed over duct (24) to the exhaust duct (26) by the fan (25).

Figure 3:
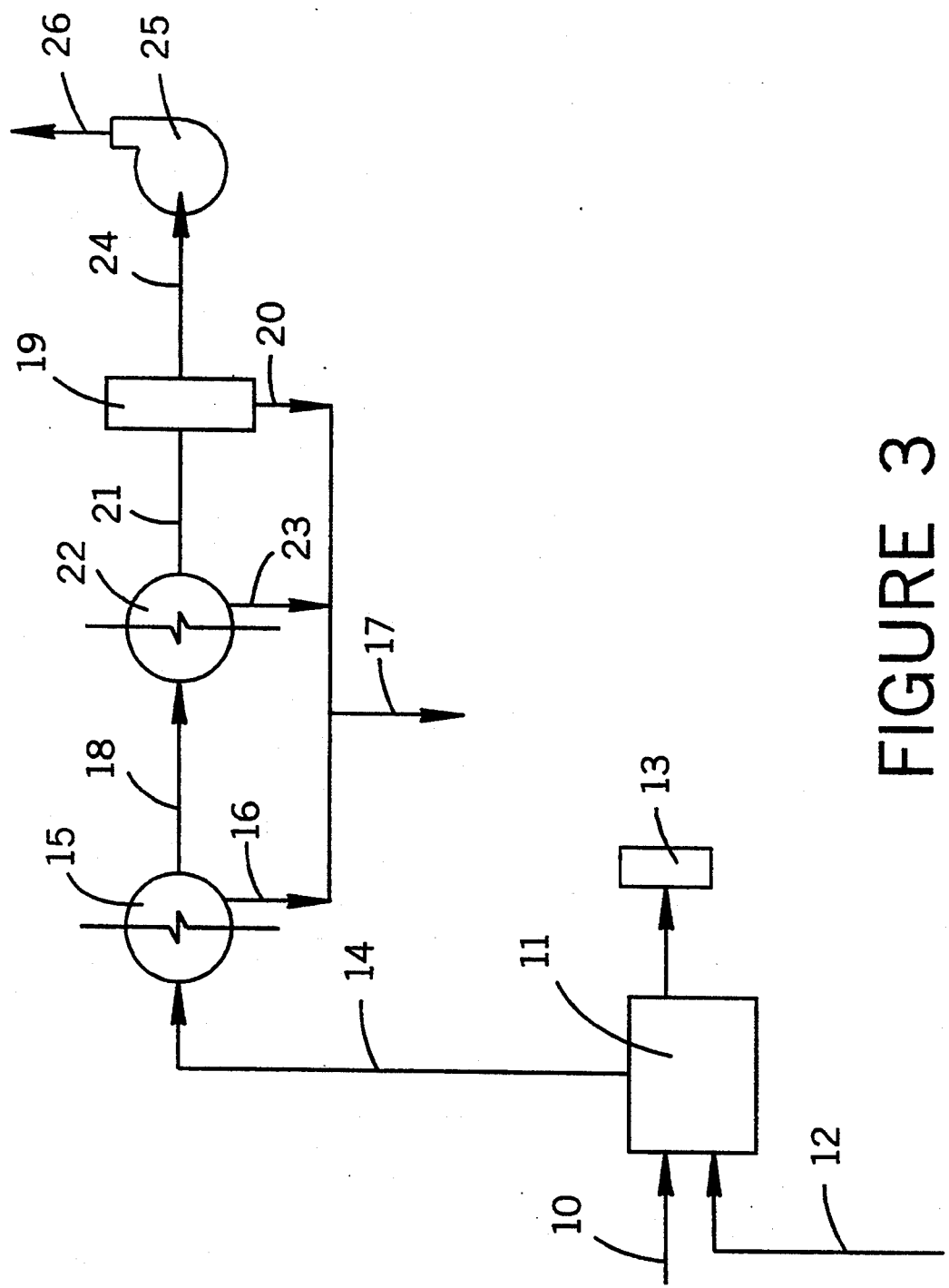
FIG. 3 is a schematic view of a modified apparatus for the process of the present invention, wherein the liquid removal system is located after the second heat exchanger.

FIG. 3 shows a modification of the apparatus, shown in FIG. 2. In this modified apparatus, the second heat exchanger (22) is connected to the first heat exchanger (15) by the duct (18). The heated air, exiting the second heat exchanger (22) is conducted to the liquid removal system (19) over duct (21) and exits the apparatus over duct (24) and exhaust duct (26) moved by the fan (25). The remaining parts are identical to the apparatus, described in FIG. 2.

Figure 4:
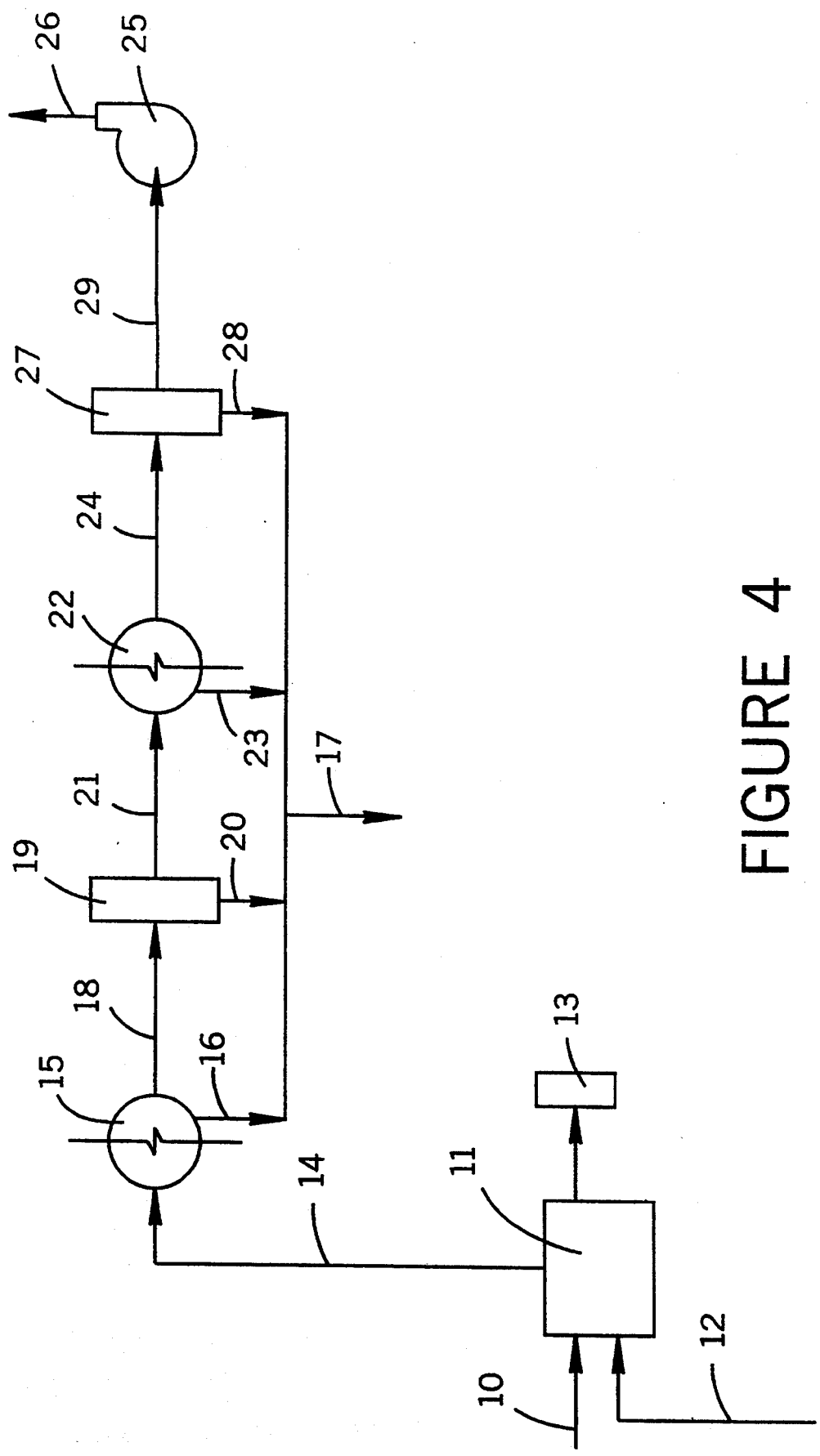
FIG. 4 is a schematic view of another modified apparatus for the process of the present invention, which has a second liquid removal system, located after the second heat exchanger.

FIG. 4 shows another modification of the apparatus shown in FIG. 2, which includes a second liquid removal system (27), such as an electrostatic precipitator, a mist eliminator, a fiberbed filter and combinations thereof. Preferred is an electrostatic precipitator, a mist eliminator, and a combination of a mist eliminator and an electrostatic precipitator, connected by a duct to each other. The second liquid removal system (27) is connected to the second heat exchanger (22) by duct (24). Condensables are removed over pipes (28) and (17) from the second liquid removal system (27). The air, exiting the second liquid removal system (27) is directed over duct (29) by the fan (25) to the exhaust duct (26).

The remaining parts are identical to the apparatus, described in FIG. 2.

Figure 5:
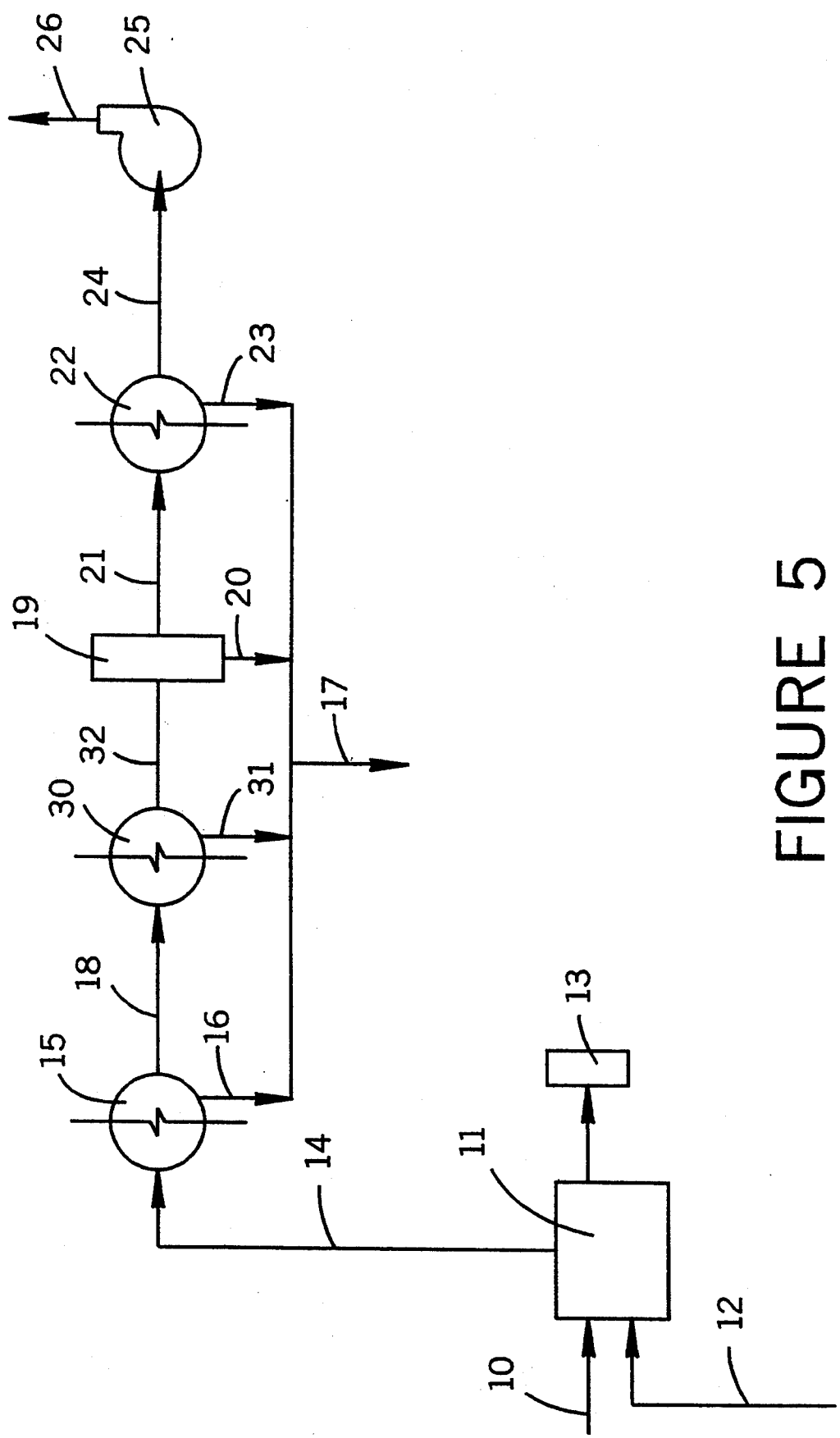
FIG. 5 is a schematic view of another modified apparatus for the process of the present invention, which has a third heat exchanger, located after the first heat exchanger.

FIG. 5 shows another modification of the apparatus shown in FIG. 2, which includes a third heat exchanger (30) for further cooling the air, which exits the first heat exchanger (15) and which is directed over duct (18) to the third heat exchanger (30). The third heat exchanger is cooled with a cooling medium, described for the first heat exchanger. Condensates are removed over pipes (31) and (17). The air exiting the third heat exchanger is directed over duct (32) to the liquid removal system (19). The remaining parts of the apparatus are identical to the apparatus, described in FIG. 2.

The apparatus for the process of the present invention is applicable to the polymerization and thermoplastic processing of all thermoplastic polymers, especially polyamides, polyesters, polyolefins, polycarbonates, polystyrenes, polyacrylonitriles, polyurethanes, polysulfones, polyethersulfones, polyvinylchloride, copolymers and mixtures thereof.

For the manufacture of fibers all fiber forming thermoplastic materials are suitable, especially polyamides, polyesters, polyolefins, polycarbonate and polyacrylonitrile.

Suitable polyamides are nylon 6, nylon 6/6, nylon 6/9, nylon 6/10, nylon 6/12, nylon 11, nylon 12, copolymers thereof and mixtures thereof. Preferred polyamides are nylon 6 and nylon 6/6. A suitable polyester is polyethylene terephthalate.

For the manufacture of fibers, the polymer is fed into an extruder in form of chips or granules, or as molten resin, melted and directed via jacketed Dowtherm ® (Dow Chemical, Midland Mich.) heated polymer distribution lines to the spinning head. The polymer melt is then metered by a high efficiency gear pump to spin pack assembly and extruded through a spinnerette. The fibers are spun at a temperature of from about 180° to 350° C. according to the respective polymer with a spinning speed of from about 1000 to about 5000 m/min, dependant on the type of polymer.

In the heatsetting process the yarn is placed on a conveying belt (not shown in the FIG's.) and sent through the heating chamber (11) in which hot air with or without steam is circulated around the yarn. This process sets the twist in the yarn, as well as improve its dyeability. During this process, emissions like monomers and/or oligomers and/or finish oil are released. In the case of polycaprolactam, caprolactam and finish oil is released.

In step (a) of the process of the present invention which is described with reference to FIG. 2, air, containing the emissions, is collected at the exit of the heating chamber (11). The air in duct (14) has a temperature of from about 40° to about 300° C., preferably from about 45° to about 170° C. The air, containing the emissions, is directed in step (b) through duct (14) to a means for cooling the air. Suitable means are a cooler or a heat exchanger. Preferred is a heat exchanger (15) in which the air is cooled to a temperature of from about 0.1° to about 65° C. preferably from about 4° to about 54° C. Condensation occurs in this first heat exchanger (15) and the condensate is removed over ducts (16) and (17). A suitable heat exchanger for cooling the air coming out of duct (14) is the Wringer ®, unit manufactured by Des Champs Laboratories, Va. The heat transferred to the cooling medium can be rejected by a cooling tower or a heat exchanger.

The air exiting the first heat exchanger (15) is directed in step (c) to the liquid removal system (19), where liquid droplets are removed from the air. Suitable liquid removal systems are electrostatic precipitators like those from United Air Specialists, Trion, and Beltran; mist eliminators like mesh filters such as Permanent Heavy Duty Air or Grease Filters by Rutzler; and fiberbed filters like those from KOCH, and combinations thereof. Preferred are a combination of a mist eliminator and an electrostatic precipitator being connected by a duct to each other.

The air exiting the precipitator (19) is directed in step (d) to a means for heating the air which is a heater like an electrical heater or preferably a second heat exchanger. In this second heat exchanger (22) the air is heated to about 4° to about 93° C., preferably to about 10° to about 77° C.

The air leaving the second heat exchanger (22) is directed over duct (24) by fan (25) to the exhaust duct (26) and released in the environment.

In an alternative process in accordance with FIG. 3, the air exiting the first heat exchanger (15) is directed in step (c) to the means for heating the air which may be a heater or preferably a heat exchanger (22) in which it is heated to about 4° to about 93° C., preferably to about 10° to about 77° C. before the heated air is directed to the liquid removal system (19) in step (d), where liquid droplets are removed from the air. The other steps (a) and (b) of this alternative process are identical to the process described with reference to FIG. 2.

In another alternative process in accordance with FIG. 4, one additional step is added to the process, described with reference to FIG. 2, which is directing the air, exiting the means for heating the air in step (d) to a second liquid removal system (27) before it is directed over duct (29) by fan (25) to the exhaust duct (26). Liquid droplets are removed over pipes (28) and (17). Another alternative process of the present invention has a second cooling step for the air, exiting the first heat exchange (15) in accordance with FIG. 5. In this process the air is cooled in the first heat exchanger to a temperature of from about 21° to about 90° C., preferably from about 32° to about 71° C. The air leaving this first heat exchanger (15) is directed over duct (18) to the second means for cooling the air, which is a cooler or preferably a third heat exchanger (30), in which the air is cooled to a temperature of from about 0.1° to about 65° C., preferably to about 4° to about 54° C. Condensibles are removed over pipes (31) and (17). The air leaving the third heat exchanger (30) is directed over duct (32) to the liquid removal system (19). The other steps of this alternative process are identical to the process described with reference to FIG. 2. This process has the advantage, that the two cooling steps are more flexible and more effective in comparison to one cooling step.

In all processes, described above, the opacity of the air is reduced from greater than 25% entering the system unit at duct (14) to less than 5% exiting the system at duct (26). The exhaust air is estimated to have less than 20% by volume of caprolactam emissions and less than 20% by volume of finish oil emissions.

EXAMPLE

Nylon 6 carpet yarn (Ultramid ® B of BASF AG, Germany, with a relative viscosity of 2.5, measured as a 1% by weight solution in 90% formic acid at 25° C.) was heat set in two heat setting units from Suessen.

The combined through put of fiber is 284 kg/hr. Steam is injected into each heatsetting unit at a rate of 483 kg/hr.

The air containing the emissions at the exit of the heating chamber has a total flow rate of 67 m³/min, a temperature of 103° C. dry bulb and 72° C. wet bulb, and consists of air, water vapor, caprolactam, and finish oil. The air stream leaving the Suessen heatsetting units is cooled to saturation by the first heat exchanger to 43° C. dry and wet bulb with coils using 25.6° C. cooling tower water. Approximately 0.02 m³/min condensate is formed from the first heat exchanger. The air is directed to a mesh-type Permanent Heavy Duty Air or Grease Filter mist eliminator by Rutzler. The air leaving the mist eliminator is directed to an electrostatic precipitator manufactured by Thiel Industries to remove the remaining liquid in the air stream. The air is then directed to the second heat exchanger, an air-to-steam heat exchanger utilizing steam coils for heating the air leaving the electrostatic precipitator away from saturation to an exit temperature of 66° C. dry bulb and 42° C. wet bulb before being exhausted by a fan to the exhaust duct.

We claim:

1. A process for removing fiber finish oil emissions entrained in a moisture-laden air stream obtained from a synthetic fiber processing system and for reducing opacity of the air stream so that the air stream may be exhausted to atmosphere, said process comprising the steps of:
    (a) collecting the fiber finish oil emissions-containing moisture-laden air stream;
    (b) cooling the collected emissions-containing moisture-laden air to a moisture saturation temperature at which moisture contained in said air condenses to liquid so as to form a first liquid aqueous condensate stream, and an air discharge stream containing moisture-saturated air and liquid droplets of said fiber finish oil emissions;
    (c) removing said liquid droplets of said fiber finish oil emissions from the air stream to form a second liquid condensate stream containing a substantial portion of said fiber finish oil emissions; and
    (d) heating the air discharge stream to a temperature above its moisture-saturation temperature to desaturate the air of moisture and thereby form an exhaust air stream having reduced opacity which may be released to atmosphere.

2. The process according to claim 1, wherein the cooled air of step (b) is heated before the liquid droplets of fiber finish oil are removed from the air according to step (c).

3. The process according to claim 2, wherein the exhaust air stream of step (d) is directed to a liquid droplet removal system for removing liquid fiber finish oil droplets therefrom prior to being released to atmosphere.

4. The process according to claim 3, wherein the liquid removal system includes at least one liquid removal unit selected from the group consisting of an electrostatic precipitator, a mist eliminator, and a fiberbed filter.

5. The process according to claim 4, wherein the liquid removal unit is an electrostatic precipitator.

6. The process according to claim 4, wherein liquid removal system is a combination of both a mist eliminator and an electrostatic precipitator, being connected by a duct to each other.

7. The process according to claim 1, wherein the cooling of the air in step (b) is performed in a heat exchanger.

8. The process according to claim 1, wherein the liquid fiber finish oil droplets are removed from the air stream by a liquid removal system which includes at least one liquid removal unit selected from the group consisting of an electrostatic precipitator, a mist eliminator, and a fiberbed filter.

9. The process according to claim 8, wherein the liquid removal unit is an electrostatic precipitator.

10. The process according to claim 8, wherein the liquid removal system is a combination of both a mist eliminator and an electrostatic precipitator.

11. The process according to claim 1, wherein the heating of the air in step (d) is performed in a heat exchanger.

12. The process according to claim 1, wherein the cooling in step (b) is performed by passing the air stream sequentially through first and second heat exchangers.

13. The process according to claim 12, wherein the air stream is cooled by said first heat exchanger to a temperature between about 21° to about 90° C., and thereafter is cooled by said second heat exchanger to a temperature between about 0.1° to about 65° C.

14. The process according to claim 1, wherein the fiber finish oil emissions-containing moisture-laden air stream has a temperature of from about 40° to about 300° C.

15. The apparatus according to claim 1, wherein the air stream is cooled in step (b) to about 0.1° to about 65° C.

16. The process according to claim 1, wherein the air discharge stream is heated in step (d) to about 4° to about 93° C.

17. The process according to claim 1, wherein step (a) is practiced by collecting a fiber finish oil emissions-containing moisture-laden air stream from a synthetic fiber spinning operation.

18. The process according to claim 1, wherein step (a) is practiced by collecting a fiber finish oil emissions-containing moisture-laden air stream from a heat-setting operation for the manufacture of synthetic yarns.

19. The process according to claim 1, wherein step (a) is practiced by collecting a fiber finish oil emissions-containing moisture-laden air stream from a heat-setting operation for the manufacture of polycaprolactam yarns.

20. In a process for heat-setting twisted nylon carpet yarn which includes subjecting the nylon carpet yarn to a heated moisture-laden air environment within a heat-setting chamber at a temperature between about 40° to about 300° C. to thereby heat-set the same, the improvement comprising reducing condensable vaporous caprolactam and finish oil emissions contained within an air stream removed from the heated air environment of the heat-setting chamber during heat-setting of said twisted nylon carpet yarn, and for reducing opacity of said emissions-containing air stream sufficient to exhaust said air stream to atmosphere, said improved process comprising the steps of:
    (a) directing moisture-laden air containing condensable vaporous caprolactam and finish oil emissions removed from said heated air environment of said heat-setting chamber to a first heat exchanger and cooling said emissions-containing air therein to a moisture saturation temperature between about 0.1° to about 65° C. sufficient to form a liquid aqueous condensate stream containing a condensed portion of said emissions, and an air stream in which a remaining portion of said emissions in the form of liquid droplets is entrained;

(b) introducing the air stream to an electrostatic precipitator and removing said liquid droplets from said air stream thereby so as to remove a substantial part of said remaining portion of said emissions entrained in said air stream; and (c) directing said air stream to a second heat exchanger which heats the air stream to a temperature above its saturation temperature of between about 4° to about 93° C. sufficient to desaturate the air stream of moisture and thereby form an exhaust air stream having a reduced opacity of less than 5% which may be released to atmosphere.

21. In the process of claim 20, the improvement wherein said air stream is directed sequentially through said first heat exchanger, said electrostatic precipitator and said second heat exchanger.

22. In the process of claim 20, the improvement wherein said air stream is directed sequentially through said first heat exchanger, said second heat exchanger and said electrostatic precipitator.

23. In the process of claim 20, the improvement further comprising passing the air stream through a mist eliminator which is fluid-connected to and between said first and second heat exchangers, and wherein said air stream is passed through said electrostatic precipitator which is fluid-connected to and downstream of said second heat exchanger.

24. In the process of claim 20, the improvement wherein step (a) is practiced by passing the air stream through first and second cooling units fluid-connected in series with one another, and wherein said air stream is directed through said electrostatic precipitator which is fluid-connected to and between said second cooling unit and said second heat exchanger.

* * * * *